United States Patent
Bertrand et al.

(10) Patent No.: US 9,166,717 B2
(45) Date of Patent: Oct. 20, 2015

(54) UPLINK SYNCHRONIZATION MAINTENANCE PRINCIPLES IN WIRELESS NETWORKS

(75) Inventors: Pierre Bertrand, Antibes (FR); Tarik Muharemovic, Pearland, TX (US); Zukang Shen, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/531,006

(22) Filed: Jun. 22, 2012

(65) Prior Publication Data

US 2013/0242973 A1 Sep. 19, 2013

Related U.S. Application Data

(63) Continuation of application No. 12/111,810, filed on Apr. 29, 2008, now Pat. No. 8,218,526.

(30) Foreign Application Priority Data

Apr. 30, 2007 (EP) ..................................... 07290536

(51) Int. Cl.
*H04J 3/06* (2006.01)
*H04W 56/00* (2009.01)

(52) U.S. Cl.
CPC ............. *H04J 3/06* (2013.01); *H04W 56/0005* (2013.01)

(58) Field of Classification Search
CPC ............................... H04W 56/0005; H04J 3/06
USPC .......................................... 370/350; 455/502
See application file for complete search history.

(56) References Cited

U.S. PATENT DOCUMENTS

| 6,967,936 B1 | 11/2005 | Laroia et al. |
| 7,778,151 B2 | 8/2010 | Bertrand et al. |
| 7,898,983 B2 | 3/2011 | Laroia et al. |
| 7,955,607 B2 | 6/2011 | Ushio et al. |

(Continued)

FOREIGN PATENT DOCUMENTS

WO WO 2006/106616 A1 10/2006

OTHER PUBLICATIONS

Texas Instruments, "UL Synchronization Management and Maintenance in E-ETRA", 3GPP TSG RAN WG1 #49, R1-072198, Kobe, Japan, May 7-11, 2007, pp. 1-7.

(Continued)

*Primary Examiner* — Donald Mills
*Assistant Examiner* — Henry Baron
(74) *Attorney, Agent, or Firm* — Ronald O. Neerings; Frank D. Cimino

(57) ABSTRACT

A cell within cellular network includes user equipments (UEs) that transmit data to a base station (eNB). Over a period of time, not all of the UEs will have data to transmit. The UEs are tracked as a scheduled portion and an unscheduled portion, wherein a UE is included in the scheduled portion in response to receiving a scheduling request from the UE. Synchronization is maintained between the eNB and each UE in the scheduled portion by sending a timing adjustment (TA) command if needed. Synchronization is maintained between the eNB and each UE in the unscheduled portion by allocating a periodic reference signal (sync-RS) to each UE in the unscheduled portion and by sending a respective timing adjustment (TA) command if needed to each respective UE in the unscheduled portion in response to a respective sync-RS received from each UE in the unscheduled portion.

21 Claims, 9 Drawing Sheets

(56) References Cited

U.S. PATENT DOCUMENTS

| | | | |
|---|---|---|---|
| 8,068,427 | B2 | 11/2011 | Gholmieh et al. |
| 8,116,292 | B2 | 2/2012 | Terry |
| 2006/0156370 | A1* | 7/2006 | Parantainen ................ 725/132 |
| 2009/0239568 | A1 | 9/2009 | Bertrand et al. |
| 2010/0098051 | A1 | 4/2010 | Uemura |
| 2011/0065378 | A1 | 3/2011 | Watanabe |

OTHER PUBLICATIONS

Texas Instruments, "On the need for UE-initiated timing adjustment request in E-UTRA", 3GPP TSG RAN WG1 #49bis, R1-072842, Orlando, USA, Jun. 25-29, 2007, pp. 1-3.

Texas Instruments, "Preamble-based Scheduling Request in E-UTRAN", 3GPP TSG RAN WG1 #49, R1-072193, Kobe, Japan, May 7-11, 2007, p. 1-6.

Texas Instruments, "Contention-free preamble-based synchronized random access," 3GPP TSG RAN WG1 #47bis, R1-070259, Sorrento, Italy, Jan. 15-19, 2007, pp. 1-6.

Texas Instruments, "Interference between Data and Preamble-Based Scheduling Request in E-UTRAN", 3GPP TSG RAN WG1 #48, R1-070717, St. Louis, USA, Feb. 12-16, 2007, pp. 1-6.

Texas Instruments, "Preamble-Based Scheduling Request: Comparison with Other Solutions", 3GPP TSG RAN WG1 #48, R1-070718, St. Louis, USA, Feb. 12-16, 2007.

Texas Instruments, "Scheduling Request and DRX", 3GPP TSG RAN WG1 #48bis, R1-071472, St. Julians, Malta, Mar. 26-30, 2007, pp. 1-5.

Texas Instruments, "Simulation of Uplink Timing Error Impact on PUSCH", 3GPP TSG RAN WG1 #48bis, R1-071479, St. Julians, Malta, Mar. 26-30, 2007, pp. 1-5.

El-Sallabi, H.M, et al., "Experimental Evaluation of Rake Finger Life Distance for CDMA Systems", IEEE Antennas and Wireless Propagation Letters, vol. 1, 2002, pp. 1-3.

3GPP TS 25.101, "UE Radio Transmission and Reception (FDD)", 3GPP TSG RAN WG4 TSG R4#6 (99) 412, Jul. 26-29, 1999, Queensferry, United Kingdom, pp. 1-43.

NTT Docomo, et al., "Necessity of Multiple Bandwidths for Sounding Reference Signals", 3GPP TSG RAN WG1 Meeting #48bis, R1-071644, St. Julians, Malta, Mar. 26-30, 2007 (Original R1-070090), pp. 1-10.

Texas Instruments, "Sounding Reference Signal Assignments in E-UTRA Uplink", 3GPP TSG RAN WG1#48 bis, R1-071484, St. Julian, Malta, Mar. 26-30, 2007, pp. 1-7.

Samsung, "Estimated peak hour loads in LTE", 3GPP TSG RAN WG1 Meeting #47bis, R1-070004, , Sorrento, Italy, Jan. 15-19, 2007, and 3GPP TSG-RAN2 Meeting #56, R2-063631, Riga, Lativia, Nov. 6-10, 2006, pp. 1-2.

Samsung, "LTE cell load / RACH load estimations", 3GPP TSG-RAN3 Meeting #56bis, R2-070205, Sorrento, Italy, Jan. 15-19, 2007, pp. 1-7.

NTT Docomo, et al., "Uplink Synchronization", 3GPP TSG RAN WG2 #57bis, R2-071300, Mar. 26-30, 2007, St. Julian's, Malta, pp. 1-3.

Texas Instruments, "Simulation of Uplink Timing Error Impact on PUSCH", 3GPP TSG RAN WG1 #49bis, R1-072841, Orlando, USA, Jun. 25-29, 2007, pp. 1-5.

3GPP TS 36.211 v8.2.0, Technical Specification Group Radio Access Network; Physical Channels and Modulation (Release 8), Mar. 2008, pp. 1-67.

* cited by examiner

UPLINK SYNCHRONIZATION MAINTENANCE PRINCIPLES IN WIRELESS NETWORKS

CLAIM OF PRIORITY UNDER 35 U.S.C. 119(a)

The present application is a continuation of application Ser. No. 12/111,810 filed Apr. 29, 2008 now U.S. Pat. No. 8,218,526, which claims priority to and incorporates by reference European Patent Application No. 07290536.7, filed on Apr. 30, 2007, entitled "Uplink Synchronization Maintenance Principles in Wireless Networks".

FIELD OF THE INVENTION

This invention generally relates to wireless cellular communication, and in particular to use of a contention-free scheduling request channel in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access Network (E-UTRAN), are being standardized by the 3GPP working groups (WG). OFDMA and SC-FDMA (single carrier FDMA) access schemes were chosen for the down-link (DL) and up-link (UL) of E-UTRAN, respectively. Without loss of generality, OFDMA and SC-FDMA symbols are hereafter referred to as "OFDM symbol". User Equipments (UE's) are time and frequency multiplexed on a physical uplink shared channel (PUSCH), and a fine time and frequency synchronization between UE's guarantees optimal intra-cell orthogonality. The UE autonomously maintains its DL synchronization from well known DL synchronization signals broadcasted by the Base Station. UL synchronization requires Base Station involvement. In case the UE is not UL synchronized, it uses a Physical non-synchronized Random Access Channel (TRACH), and the Base Station (also referred to as eNodeB) provides back some allocated UL resource and timing advance information to allow the UE transmitting on the PUSCH.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user Control information bits are transmitted, for example, in the uplink (UL), for several purposes. For instance, Downlink Hybrid Automatic Repeat ReQuest (HARQ) requires at least one bit of ACK/NACK transmitted information in the uplink, indicating successful or failed circular redundancy check(s) (CRC). Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACKNACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less standalone sub-frame reliability than PUCCH. The general operation of the physical channels are described in the EUTRA specifications, for example: "3GPP TS 36.3211 v8.2.0, $3^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS) in support of UL frequency selective scheduling and/or link adaptation. In that case it typically occupies a wider bandwidth than the DM RS, confined to the UE's scheduled data bandwidth, and plays the same rote, for the UL, as the aforementioned CQI report plays for the DL. As a result, such UL RS is also referred to as the CQI-RS. Also note that the Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
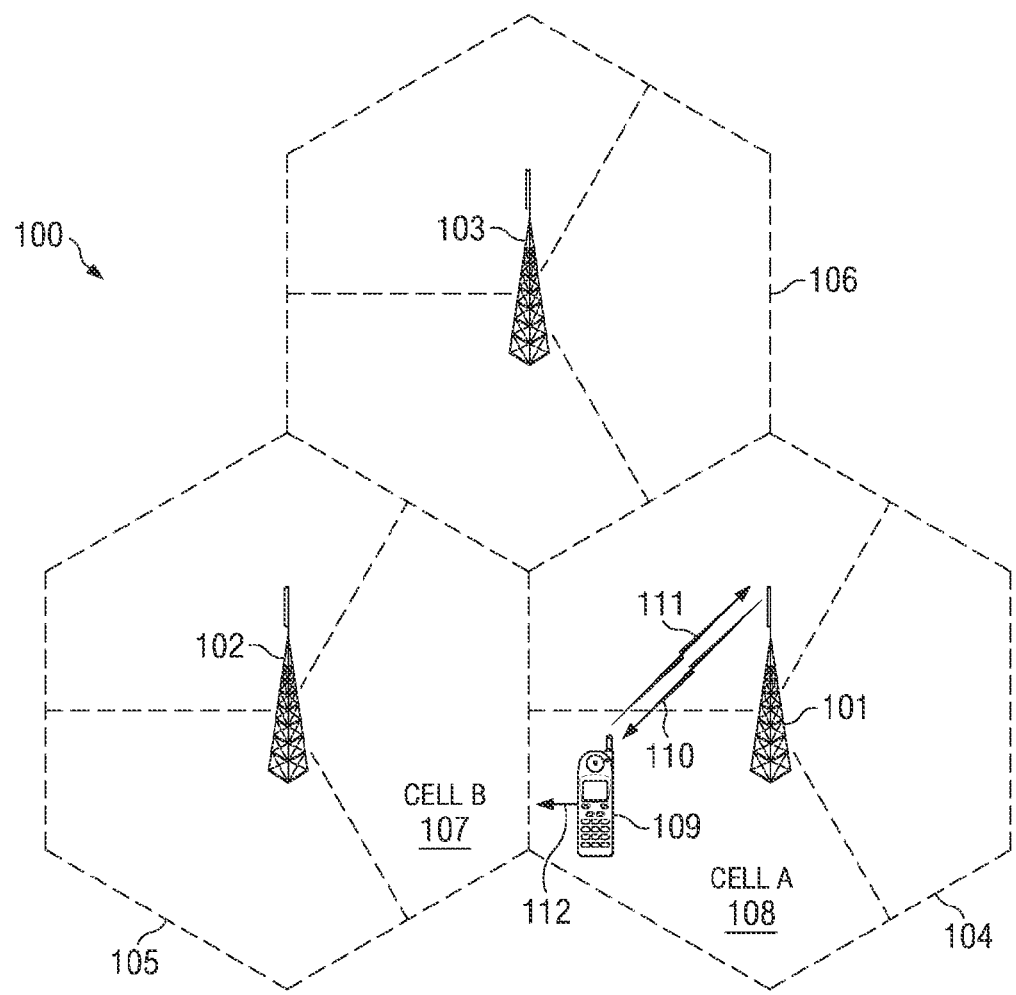
FIG. 1 is a pictorial of an illustrative telecommunications network that supports transmission of sync-RS symbols for maintaining synchronization of non-scheduled UE.

Each user device, also referred to as user equipment (UE), in the uplink synchronized state is allocated uplink resources of a base-station and is assigned, on top of its radio resource control/medium access control (RRC/MAC) 16-bit identifier (C-RNTI), a unique uplink physical layer identifier to temporarily ensure non-contentious uplink transmissions via a shared communication channel or a scheduling request channel. The group of user devices in the uplink non-synchronized state are not assigned any additional physical layer identifier and thus the total number of bits needed for the uplink physical layer identifier in the uplink synchronized state can be reduced to improve efficiency of the control signaling scheme. In at least some embodiments, each user device in the uplink non-synchronized state can monitor and receive downlink transmissions but cannot send uplink transmissions until successfully requesting uplink resources and uplink synchronization from the base-station. The uplink synchronized state is hereafter referred to as a "synchronized state" and the uplink non-synchronized state is hereafter referred to as a "non-synchronized state" or "out of sync" and applies to the uplink only. Also, the unique uplink physical layer identifier is hereafter referred to as a "reduced identifier" or a "unique identifier". Thus, it should be noted that embodiments described by these terms are not limited to uplink synchronization or to unique uplink physical layer identifiers. When a UE enters a cell and establishes contact with the base station serving that cell, it is placed in a "connected" mode and kept track of while it remains active in the cell.

UL synchronization maintenance is generally performed through the regular UL scheduled transmissions for UEs with scheduling grants, periodically assigned reference signals such as CQI-RS, or through the non-synchronous random access (RACH) mechanism for UEs without scheduling grants. However, as will be discussed in more detail below, re-using of the CQI-RSs scheduled in support of UL frequency selective scheduling and/or link adaptation disallows supporting, alone, a sufficiently large number of UEs in the synchronized state and the RACH mechanism requires too much overhead, therefore an additional mechanism is required to maintain synchronization of a large number of UEs.

Several hundred UEs are expected to be maintained in connected mode in a cell to enable fast access to transmission/reception. However, an out of sync UE in connected mode will undergo the latency of the contention-based Random Access (RA) procedure, when, for example, waking up from a dormant period; whereas UL synchronized UEs can faster access the spectrum through a contention-free procedure provided by the (synchronized) scheduling request indicator (SRI). As a result, the higher the number of UEs maintaining their UL synchronization, the lower the overall latency to transmit/receive new data. On the other hand, if the resource required to maintain UL synchronization results in too much overhead, the spectral efficiency penalty counter balances the latency gains. The number of UEs in the UL synchronized state cannot exceed the number of contention-free UL resources provided by the scheduling request (SR) procedure. Embodiments of the present invention provide an efficient solution to maintain UL synchronization of a large number of UEs in E-UTRAN with a low overhead.

In at least some embodiments, the assignment of user devices into the synchronized state and the non-synchronized state is temporary. For example, upon a successful request for uplink resources (also referred to as uplink scheduling grant), a non-synchronized user device can be reassigned to the synchronized state and receives a reduced identifier to enable uplink transmissions and contention-free scheduling requests. On the other hand, if more than a threshold amount of time passes without an uplink transmission or a timing adjustment (TA) command from the base-station, a user device in the synchronized state can be reassigned to the non-synchronized state and the reduced identifier corresponding to the reassigned user device is released. The reduced identifier can be of any form, e.g. explicit, or also implicit in the form of a unique physical resource on the contention-free scheduling request channel.

The basic assumption for managing the transition from UL synchronized state to UL non-synchronized state is that a timer in the UE is used to detect out-of-sync. Since both UE and eNB implement this time out, no explicit signaling is required from either side to monitor the synchronization state. It has been proposed (3GPP TSG RAN WG2 #57bis, R2-071300, "Uplink Synchronization") that the timer is reset when the UE receives a new timing adjustment (TA) command from the eNB. In this case, the timer simply corresponds to the duration beyond which the UE may have moved away from the UL system time to an extent that UL transmission on the PUSCH/PUCCH is no longer possible. This solution provides a simple way for the eNB to control the number of UEs in UL synchronization state. However, in low speed cells where the time-out can be large, as discussed later herein, a finer management of the contention-free SR resources allocation may require an explicit command from the eNodeB to the UE to exit the UL synchronization state and therefore release its reduced UE ID before the time out expiration.

A scheduling request indicator (SRI) is generally used by UEs that are UL synchronized, have no scheduling grants, and need to send a scheduling request in order to be granted resources for use in transmitting data or control information such as event-triggered measurements. The SRI can also be used by UEs already having one or more scheduling grants but need more (or less) UL resources and want to update the eNB about it. The SRI channel signals a scheduling request need and potentially provides some preliminary information but does not give the details of the scheduling request content which is included in the scheduling request (SR) message on PUSCH.

When a UE does not have signal and/or channel that need to be received or transmitted, it can go into a low power mode referred to as discontinuous reception (DRX) and discontinuous transmission (DTX) respectively. New generation networks employ Hybrid Automatic Retransmission request (HARQ) mechanism which requires that downlink and uplink data transmissions are acknowledged by uplink and downlink HARQ Indicators (HI) respectively. As a result, any uplink activity implies downlink activity as well, and vice versa. Therefore, DRX and DTX are coupled in practice and, without loss of generality, are referred to as DRX mode. In this mode, specific intervals are defined in which a transmission is performed to maintain synchronization and/or report periodic requested control status (e.g. periodic measurement reports), but the UE does not perform any transmissions during defined silent intervals. The length of the silent interval may be configured based on the overall activity of the UE.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

While still in cell A 108, UE 109 also employs synchronous scheduling requests to request allocation of up-link 111 time or frequency or code resources. If UE 109 has data ready for transmission, for example, traffic data, measurements report, etc., UE 109 can transmit a scheduling request indicator signal on up-link 111. If the SRI is in response to data ready to transmit, the SRI notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 (possibly) adjusts its transmit timing and transmits the data on up-link 111 employing the allotted resources during the prescribed time interval.

On the other hand, while still in cell A 108, UE 109 may not have any need to transmit or receive data for a period of time and goes into DRX mode to save power. As will be described in more detail below, it is beneficial to maintain synchronization between UE 109 and eNB 101 while UE 109 is in DRX mode.

Timing Error Tolerance

The timing error tolerance is driven by both the block error ratio (BLER) performance on PUSCH and the cyclic-shift multiplexing capacity of the CQI-RS. Simulation results in 3GPP TSG RAN WG1 #49bis, R1-072841, "Simulation of Uplink Timing Error Impact on PUSCH" show that about +/−0.5 sec timing error leads, in a worst-case scenario where adjacent UEs experience opposite timing errors, to less than 0.5 dB loss in uplink BLER performance at 10% BLER point, and that a full multiplexing of 12 user CQI-RSs per symbol can be supported without apparent degradation in uplink frequency-scheduled BLER.

Timing Adjustment Period

There are three factors contributing in synchronization loss: 1) time drift due to UE moving closer to/away from the eNodeB; 2) multipath birth-death process; and 3) clock drift. Given a maximum allowed timing error $t_{err}$, the UE motion leads to a synchronization loss, in downlink (DL), after elapsed time $$\Delta t = \frac{3.6 \times c \times t_{err}}{v}$$

where c is the speed of light (m/s) and v is the UE speed (km/h). In uplink (UL), the maximum elapsed time is $\Delta t/2$ because of the round-trip delay.

The multipath birth-death process is analyzed in H. M. El-Sallabi, H. L. Bertoni, P. Vainikainen, "Experimental Evaluation of Rake Finger Life Distance for CDMA Systems", IEEE Antennas and Wireless Propagation Letters, Vol. 1, 2002. This analysis provides measurements of the life distance of $1^{st}$, $2^{nd}$, etc strongest paths of a UE's delay profile in an urban environment. Results show that the $1^{st}$ path remains steady across the various used routes, while the life distances of the $2^{nd}$ and $3^{rd}$ paths vary from few meters to few tens of meters, which should not affect the UE's UL timing. In order to stay on the conservative side, we consider an average life distance of the $1^{st}$ path of 100 m. The multi-path delay profile (assuming fast fading averaged out) is the same in UL and DL. Therefore the timing adjustment rate due to multipath birth-death process is the same in UL and DL. However, for low speed UE's, averaging out the fading would result in a very long integration interval, which is not possible if we also want to track other (and faster) timing error sources. Therefore, the multipath delay profile variation may lead to different timing corrections in UL and DL at low speeds.

Both receive and transmit chains of the UE are driven by the UE clock which is assumed to be locked on the DL received signal with an accuracy of 0.1 ppm, as in W-CDMA. The integration in time of the frequency error translates in the same time drift in UL and DL: at most 0.1 μs per second. Note that the time drift resulting from the clock drift is automatically compensated in UL when compensated in DL, assuming the UL timing is locked on the DL timing. Therefore, the corresponding TA rate is only for DL.

Figure 2:
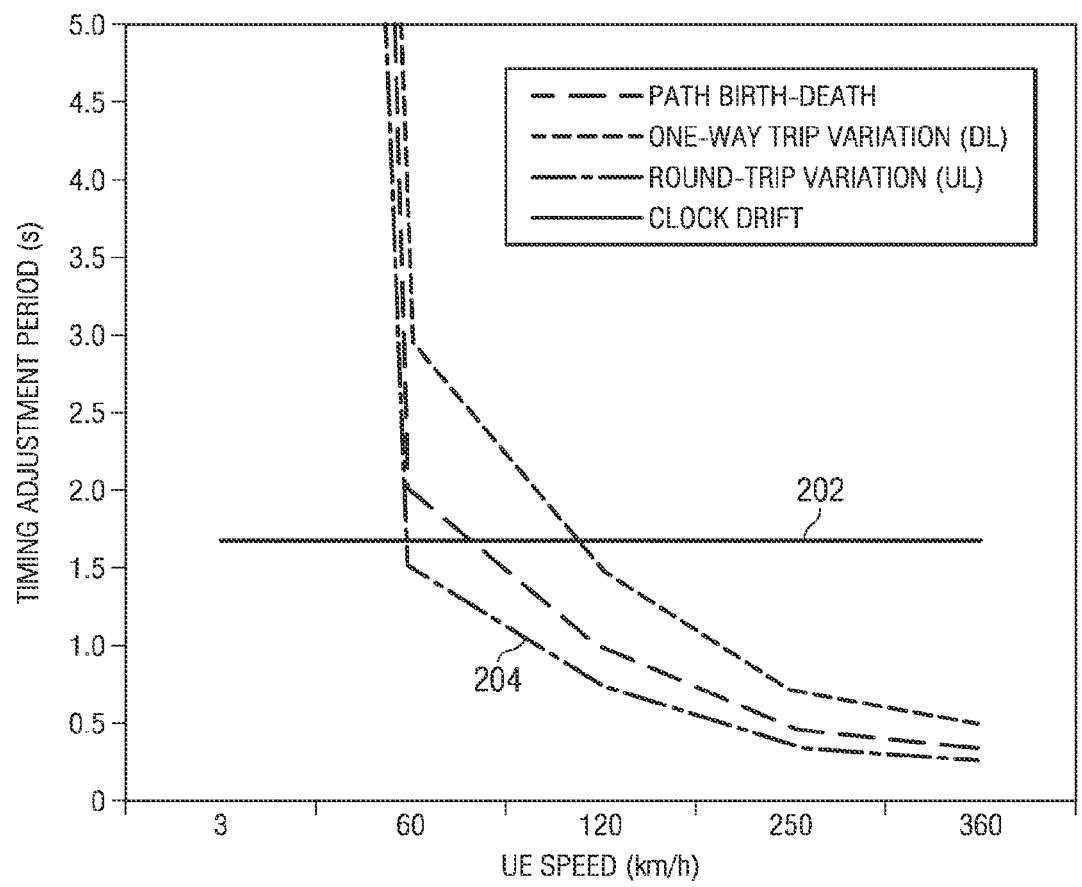
FIG. 2 is a plot illustrating typical timing adjustment periods corresponding to various error sources based on speed of the UE within the cell.

FIG. 2 is a plot illustrating typical timing adjustment periods corresponding to various error sources based on speed of the UE within the cell. For each case, the TA period is set to ⅓ of the time period after which the UE's timing error exceeds $t_{err}$=0.5 μs. At this amount of error the UE is considered out of sync. As can be observed, the clock drift 202 is the main driver for (DL) timing adjustment commands (TAs) at low speeds (below 60 km/h); at higher speeds the round-trip variation 204 due to UE motion requires the smaller UL TA period, down to 0.25 s at a speed of 360 km/h. However, even at low speed, it is a safe assumption to maintain a minimum UL TA period in the range of 2 s. In the following, the minimum of the TA period of all timing error sources is used for dimensioning purposes.

UL Synchronization Maintenance

It would be convenient if the UE could use the drift observed in DL transmission timing to correct its uplink timing. The main advantage of this approach is that no particular UL signal needs to be transmitted to the eNB. However, as discussed above, the multipath delay profile variation may lead to different timing corrections in UL and DL at low speeds. Moreover, different error sources call for different UL corrections; for example, the time drift resulting from the clock drift does not need an additional correction on top of the DL correction in UL. However the time drifts resulting from UE moving closer to or away from the eNB need twice as much compensation in UL (round-trip) compared to downlink (one-way trip). Since the UE cannot know the source of the time drill, it cannot autonomously derive the appropriate UL correction. Therefore, UL timing adjustment can only be estimated by the eNB based on the UE's UL transmission. As discussed below, both the eNB and the UE can control these UL transmissions. In the former case, the eNB uses known UL scheduled transmissions to estimate the UE's UL timing. In the latter case, the UE autonomously sends event-triggered TA requests.

Node-B Controlled UL Transmissions for TA Estimation

The Node B can maintain UL synchronization through the available UL broadband channels: the existing CQI-RS and a Sync Reference Signal (sync-RS). A limited number of UEs can be maintained in synchronization using the existing CQI-RSs already scheduled in support of frequency selective scheduling (FSS) and link adaptation. Based on the CQI-RSs distribution over three possible bandwidths (1.25, 5, 10 MHz) depending on the UE geometry, the number of orthogonal CQI-RS per 4 msec is 48 in a 10 MHz system bandwidth. The total number of multiplexed CQI-RS UEs can be improved by considering that a fraction of UEs need to transmit their CQI-RS at a lower rate (e.g. every 12 ms for distributed/persistent scheduling) or that a tighter cyclic shift multiplexing could be achieved based on tracking each UE's delay spread. However this would get the number of multiplexed CQI-RS UEs to less than a hundred in 10 MHz, which could be sufficient for the group of UEs in the scheduler range, but not for all other UEs expected to be in the connected mode in the cell. One analysis suggests there may be 800-1300 UEs per 10 MHz. As a result, those other UEs that cannot rely on an existing allocated CQI-RS must have another way for maintaining their UL synchronization.

Figure 3A:
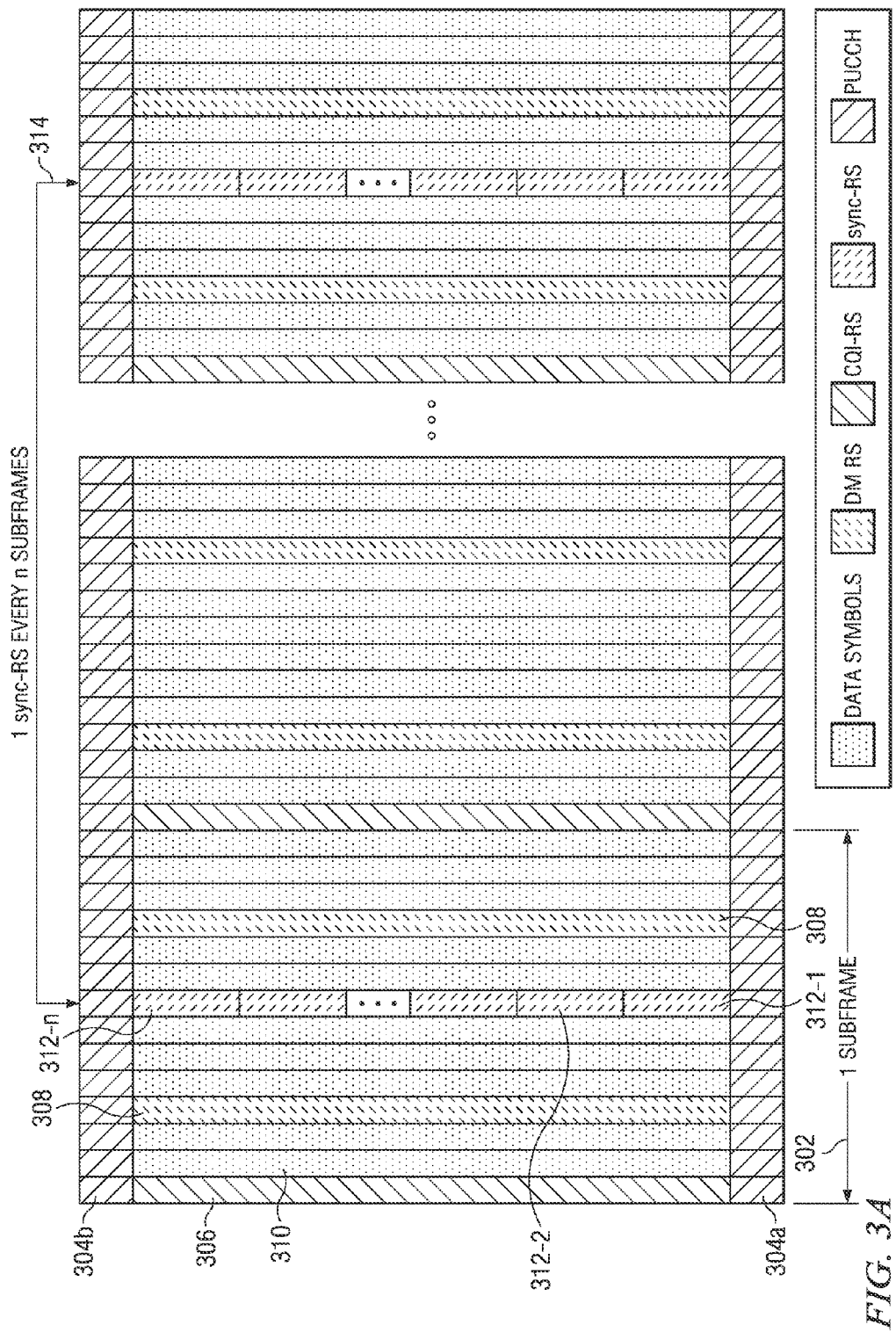
FIG. 3A is a frequency vs time plot illustrating a sequence of sub-frames that may contain periodic sync-RSs multiplexed in a specific OFDM symbol, used for synchronization of non-scheduled UEs.
Figure 3B:
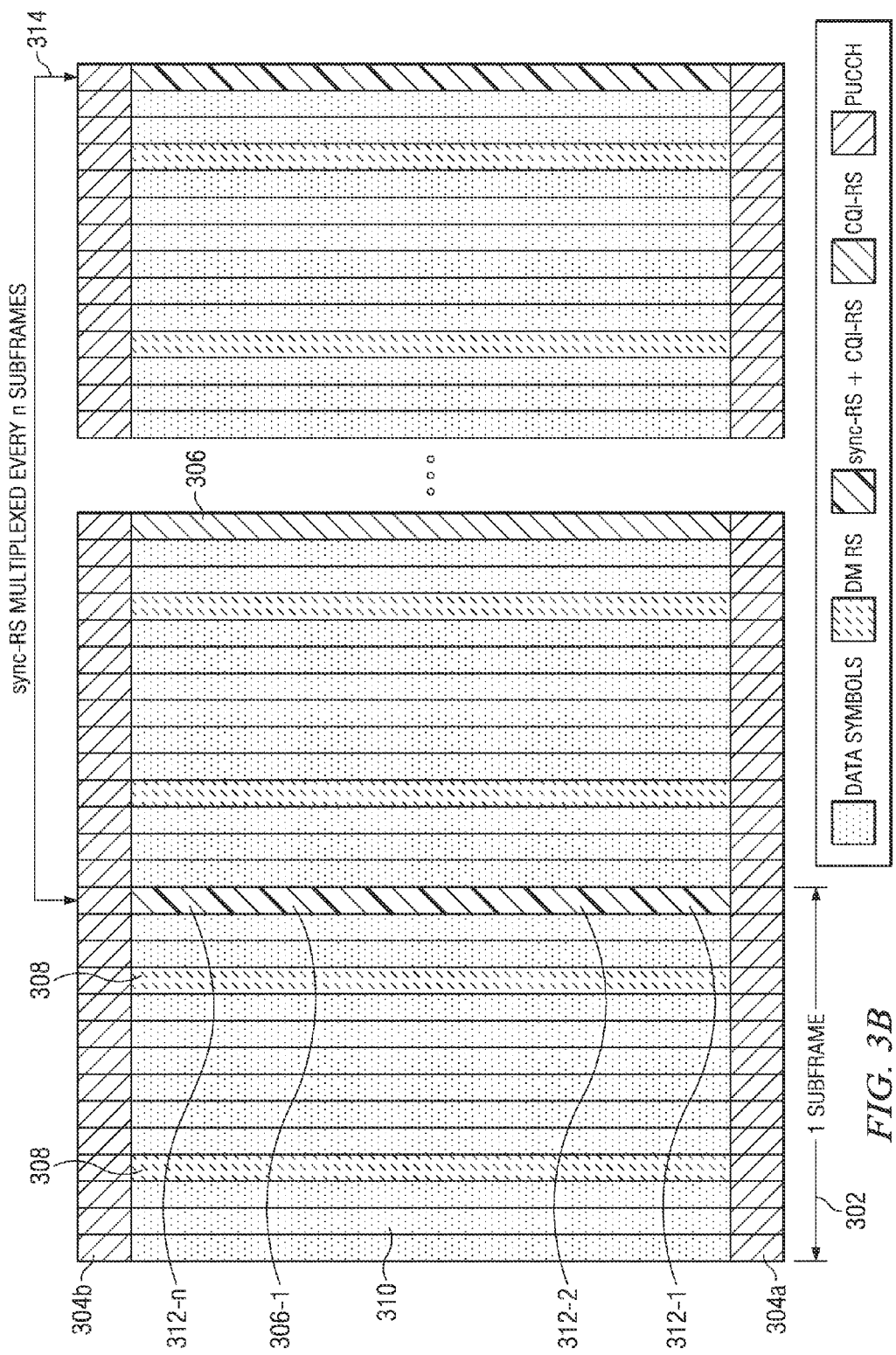
FIG. 3B is a frequency vs time plot illustrating a sequence of sub-frames that may contain periodic sync-RSs, used for synchronization of non-scheduled UEs, multiplexed with other UEs' CQI-RSs in a generic SRS OFDM symbol.

FIGS. 3A and 3B are a frequency vs time plots illustrating a sequence of sub-frames 302 that may contain a periodic sync-RS used for synchronization of non-scheduled UEs. Each sub-frame includes a CQI-RS symbol 306, two DM RS symbols 308, and eleven data symbols 310. For those UEs without an existing CQI-RS, the eNB allocates a periodic RS, sync-RS 312, for the purpose of UL synchronization maintenance. In order to provide sufficient timing estimation accuracy, the sync-RS bandwidth must occupy at least six resource blocks (RB) 1.08 MHz. Since the primary purpose of the sync-RS is UL synch, its bandwidth can be limited to just provide the targeted TA precision. Therefore, for +/−0.5 μs accuracy, approximately 1 MHz bandwidth is enough. This is a difference with the CQI-RS which bandwidth requirement is driven by the scheduling bandwidth which is typically larger. This allows frequency multiplexing of more sync-RSs than CQI-RS.

FIG. 3A illustrates one symbol used for CQI-RS 306 in each sub-frame and a different symbol used for sync-RS 312 in every $n^{th}$ sub-frame. However, as further discussed below, both CQI-RS and sync-RS are constructed and multiplexed in the same manner and only differ by their usage resulting in potentially different period and bandwidth. Therefore, they can be multiplexed together in the same OFDM symbol, also commonly referred to as sounding reference signal (SRS) symbol. As a result, in another embodiment, a portion of SRS 306 multiplexing space could be used to provide one or more sync-RS in the same symbol, since each sync-RS only requires six RBs.

FIG. 3A illustrates CQI-RS scheduled in the first symbol of a sub-frame. In another embodiment, the symbol used for CQI-RS and/or sync-RS transmission can be the last symbol of the sub-frame. FIG. 3B illustrates CQI-RS 306-1 and sync-RS 312 multiplexed together in the same (SRS) symbol being the last OFDM symbol of the sub-frame.

The current 3GPP standard specifies six RBs for the PRACH preamble bandwidth, so use of six RBs for the sync-RS is convenient for implementation. A simple approach consists in setting the sync-RS period to the maximum TA rate expected in this cell. The sync-RSs are scheduled in a symbol not used by a demodulation RS every n sub-frames, as indicated at 314. Sync-RSs 312-1, 312-2 . . . 312-n and potentially CQI-RSs 306 are orthogonally multiplexed in an SRS symbol. Without loss of generality, we denote as an SRS resource a physical resource allocated to any sync-RS or CQI-RS in the multiplex scheme of an SRS symbol. SRS orthogonal multiplexing is done in CDM and in FDM. The FDM multiplexing can be achieved through either separate bandwidths or separate sub-carriers or a combination of both. FDM multiplexing on a sub-carrier basis is also referred to as interleaved FDM (IFDM) and can be generated e.g. by signal repetition in time before the DFT precoding or through direct subcarrier mapping in frequency domain. The resulting frequency-domain signal occupies one sub-carrier every n sub-carriers where n is the repetition factor (RPF) in the time domain. The CDM multiplexing is obtained by cyclic shifting a constant amplitude zero autocorrelation (CAZAC) sequence or, as further discussed below, a CAZAC-like sequence generated e.g. through cyclic extension of a CAZAC sequence. In one embodiment, four RBs are allocated for the Physical. Uplink Control Channel (PUCCH) 304a, 304b. Therefore, assuming RPF=1, seven sync-RSs can be frequency multiplexed in 10 MHz (50 RBs). The resulting multiplexing capacity is 12 [cyclic shifts]×7 [free bins]=84 per 10 MHz sync-RS symbol.

In this embodiment, every $n^{th}$ sub-frame contains a sync-RS symbol across the entire bandwidth. One data OFDM symbol is punctured for the sync-RS. The resulting additional overhead with respect to the eleven remaining available data OFDM symbols per sub-frame depends on the scheduling rate of the sync-RSs and is reported in Error! Reference source not found. As can be seen, even at the higher speed of 360 km/h, only a 0.58% overhead is incurred to maintain 1344 UEs in synchronization with the eNB.

TABLE 1 sync-RS overhead

| UE speed | update | Nb of UEs (10 MHz) | | | | | | | | |
|---|---|---|---|---|---|---|---|---|---|---|
| (km/h) | period(s) | 588 | 672 | 756 | 840 | 924 | 1008 | 1092 | 1260 | 1344 |
| 3 | 1.67 | 0.04% | 0.04% | 0.05% | 0.05% | 0.06% | 0.07% | 0.07% | 0.08% | 0.09% |
| 60 | 1.50 | 0.04% | 0.05% | 0.05% | 0.06% | 0.07% | 0.07% | 0.08% | 0.09% | 0.10% |
| 120 | 0.75 | 0.08% | 0.10% | 0.11% | 0.12% | 0.13% | 0.15% | 0.16% | 0.18% | 0.19% |
| 250 | 0.36 | 0.18% | 0.20% | 0.23% | 0.25% | 0.28% | 0.30% | 0.33% | 0.38% | 0.40% |
| 360 | 0.25 | 0.25% | 0.29% | 0.33% | 0.36% | 0.40% | 0.44% | 0.47% | 0.55% | 0.58% |

In order to maintain synchronization, the eNB receives the sync-RS from each UE and determines a timing error. If the timing error exceeds a threshold, then a TA command is sent to the UE that is exhibiting the timing error. In response, the UE will then add or remove one sample per OFDM symbol until it reaches the correct timing. Adding can be done by repeating a sample before Tx filtering.

Figure 4:
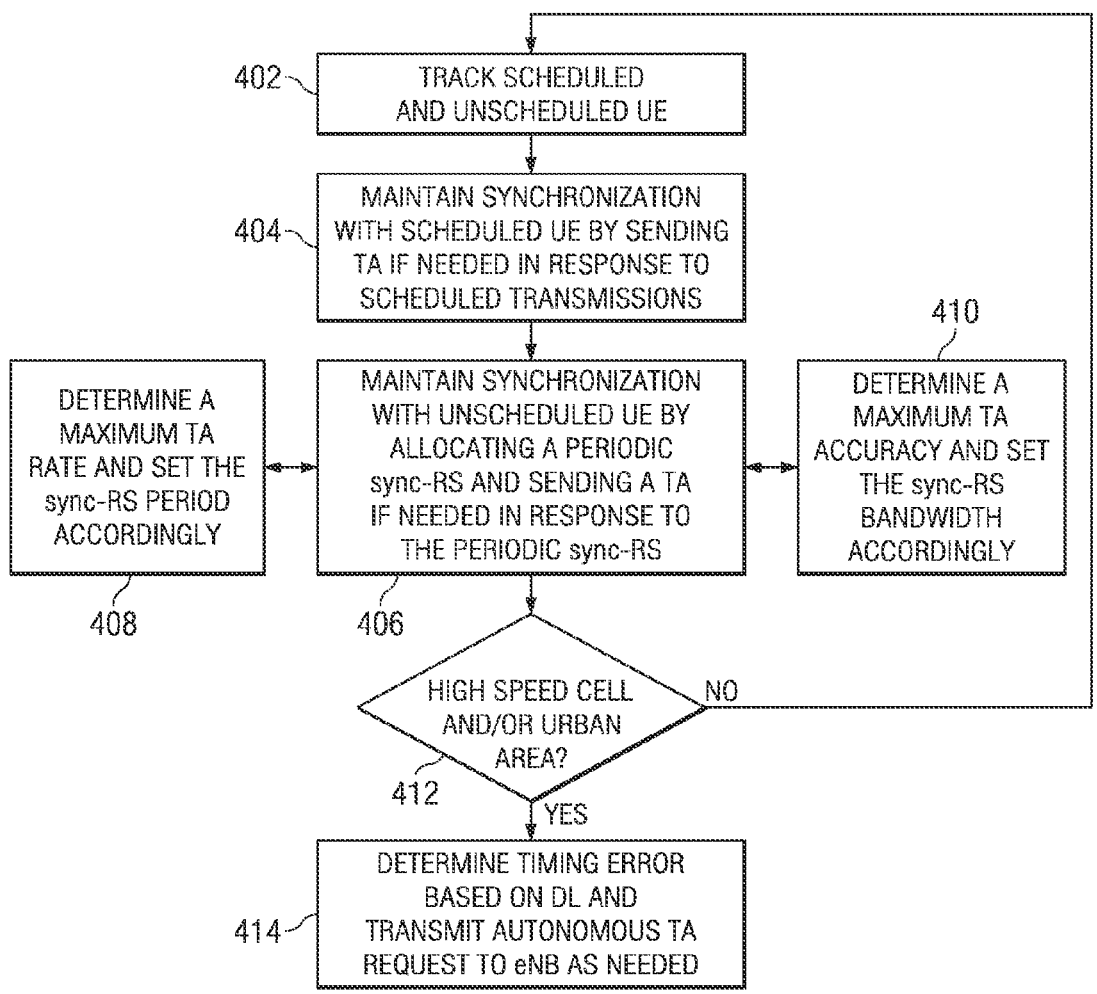
FIG. 4 is a flow diagram illustrating use of sync-RS for maintaining synchronization of non-scheduled UE.

FIG. 4 is a flow diagram illustrating use of sync-RS symbols for maintaining synchronization of non-scheduled UEs. As discussed above, the serving eNB of a cell tracks 402 the scheduled and unscheduled UEs. UEs are moved from the unscheduled group to the scheduled group when a scheduling request is received. If a time period passes that exceeds an agreed upon limit without receiving scheduling request from a UE with no known scheduling needs, then the UE is moved from the scheduled group to the unscheduled group.

For UEs within the scheduled group, synchronization is maintained 404 by sending a TA when it is needed in response to a scheduled transmission from each UE. The scheduled transmission may be a CQI-RS, or any sort of data or control channel transmission, for example.

For UEs within the unscheduled group, the eNB allocates 406 an SRS resource to each corresponding UE to transmit a periodic sync-RS to the eNB. In response, the eNB sends a TA command to the UE if the resulting timing error exceeds a threshold. In response, the UE will then add or remove one sample per OFDM symbol until it reaches the correct timing. Adding can be done by repeating a sample before Tx filtering. The sync-RS is not transmitted in a symbol slot used for the demodulation RS (DM RS) in order to avoid interfering with the transmitted DM RS. Similarly, it is not combined with data in a data symbol. However, as discussed above, some embodiments may re-use a portion of any SRS symbol for one or more sync-RS symbols. By orthogonally multiplexing the sync-RS in code division multiplexing (CDM) and in frequency division multiplexing (FDM) a large number of contention free sync-RS can be supported with a low amount of overhead.

The period used for sending the periodic sync-RS may be determined in a variety of ways. For example, a maximum TA rate that is expected for the cell may be determined 408 based on the expected UE speeds within the cell, as discussed with reference to FIG. 2. In another embodiment, the eNB keeps track of the speed of each UE individually and sets each UE's sync-RS period accordingly.

The bandwidth used for sending the sync-RS may be determined by the required TA accuracy 410. The sync-RS bandwidth is then set to approximately equal the inverse of the maximum TA accuracy target.

Event-triggered TA Requests

As mentioned previously, there is an obvious correlation between the rate of DL timing adjustments and the rate of UL timing adjustments due to UE motion due to time drift and mullipath birth-death process. Therefore, in high speed cells where these sources are the main time drift drivers, it can make sense to trigger UL TA based on DL TA, e.g. the UE autonomously sends a request for timing adjustment (TA) to the Node B when the synchronization loss observed in DL exceeds a pre-defined timing error threshold. In this case, the UE sends "on demand" TA update requests. These may be sent in addition to periodically scheduled synch_RSs used for maintaining sync, or in some embodiments high speed cells may be configured to only use autonomous TA update requests. This approach can be useful in low-speed cells as well to track sudden path profile variations typically occurring in urban environments (e.g. when UE turns around a block).

Figure 5:
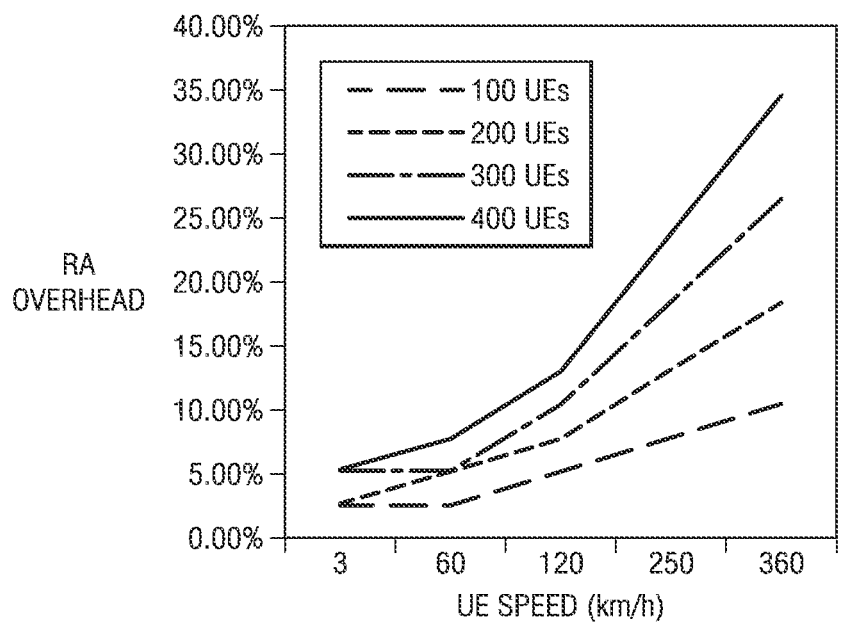
FIG. 5 is plot illustrating overhead resulting from the use of the random access channel versus speed of the UE to send TA requests for various numbers of UE.

The UE can use the following channels to send TA requests: Random Access (PRACH), scheduling request indicator (SRI). The PRACH is one possible channel an UL synchronized UE can use to send TA request's and its preamble provides means for TA estimation. Also, a TA field is already provisioned in the RA response in the RA procedure. However, there is an associated overhead cost due to the resulting offered load increase. Assuming the current operating collision probability per UE used in RAN2, $p_{coll}^{UE}=1\%$ PRACH time-frequency slot (64 signatures) per 10 ms per 5 MHz can handle an offered load of $G=-64\,\mathrm{Ln}(1-p_{coll}^{UE})=0.6432$ average Random Access (RA) attempts per PRACH slot, which translates into 128 attempts/s in 10 MHz. This load corresponds to a "normal" expected RA load when the RA is not expected to be used to maintain UL synchronization. Therefore, autonomous TA requests will necessarily require additional PRACH slots. As a result, the RA overhead due to TA requests is quantified in UL by both the additional PRACH time-frequency slots required to maintain $P_{coll}^{UE}$ and the following message, required for contention resolution purpose. Assuming this message occupies 1 RB/1 sub-frame, the load can be derived from the worst-case TA period of the different timing error sources elaborated with reference to FIG. 2. To remain on a conservative side, the overhead impact of collisions with the RA is not accounted for. The resulting RA overhead in 10 MHz is illustrated in FIG. 5A. It can be observed that even for low to medium speeds the extra cost for maintaining UL synchronization of a hundred users is quite significant.

The scheduling request indicator (SRI) is a contention free channel that allows UEs to transmit scheduling requests. For example, the SRI defined in the LTE specifications, "3GPP TS 36.3211 v8.2.0, $3^{rd}$ Generation Partnership Project; Technical Specification Group Radio Access Network; Evolved Universal Terrestrial Radio Access (E-UTRA); Physical Channels and Modulation (Release 8)" as PUSCH format 1 in Section 5.4.1, allows supporting UEs in a 5 MHz spectrum assuming a typical SRI provisioning where one frequency RB (180 kHz) is permanently dedicated to SRI transmissions and the SRI period per UE is 10 sub-frames or 10 ms, so as to keep the average waiting time of a scheduling request to 5 ms. Given a 5 MHz spectrum occupies 25 RBs, the resulting constant overhead of this SRI allocation is $\frac{1}{25}=4\%$.

Figure 6:
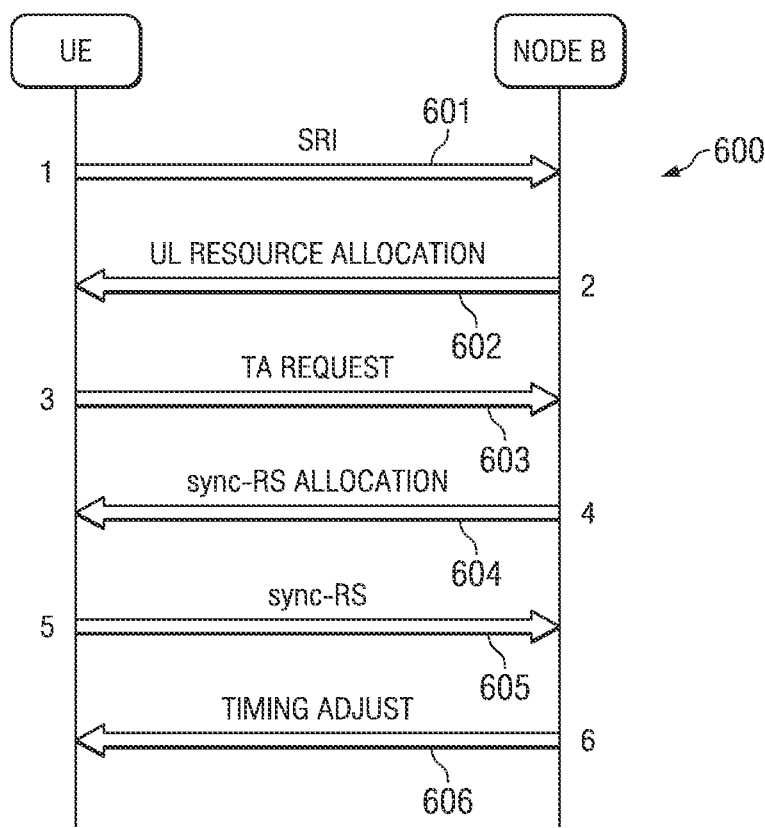
FIG. 6 is a ping-pong chart illustrating an SRI-based TA request procedure.

The narrow bandwidth (1 RB) of the aforementioned SRI structure disallows the eNB to perform a one-shot TA estimation. Therefore the current SRI procedure, designed to support conveying new scheduling request from UEs, is augmented as 600 in FIG. 6 to allow requesting a sync-RS transmission in support of a IA request. As in the regular scheduling request procedure, the UE sends a contention-free SRI 601 to inform the eNB that it has a new scheduling request. Upon SRI detection, the eNB allocates and transmits to the UE in SRI response 602 some UL resource on the PUSCH for the scheduling request message 603. The UE transmits scheduling request message 603 where it informs the eNB that it actually only needs a TA update (TA request). Upon decoding the TA request 603, the eNB allocates and transmits to the UE a sync-RS resource in message 604. The UE sends a the sync-RS 605 accordingly, which the eNB uses to estimate the UL timing of the UE. The eNB further sends back a timing adjustment (TA) 606 to the UE, if needed.

Figure 7A:
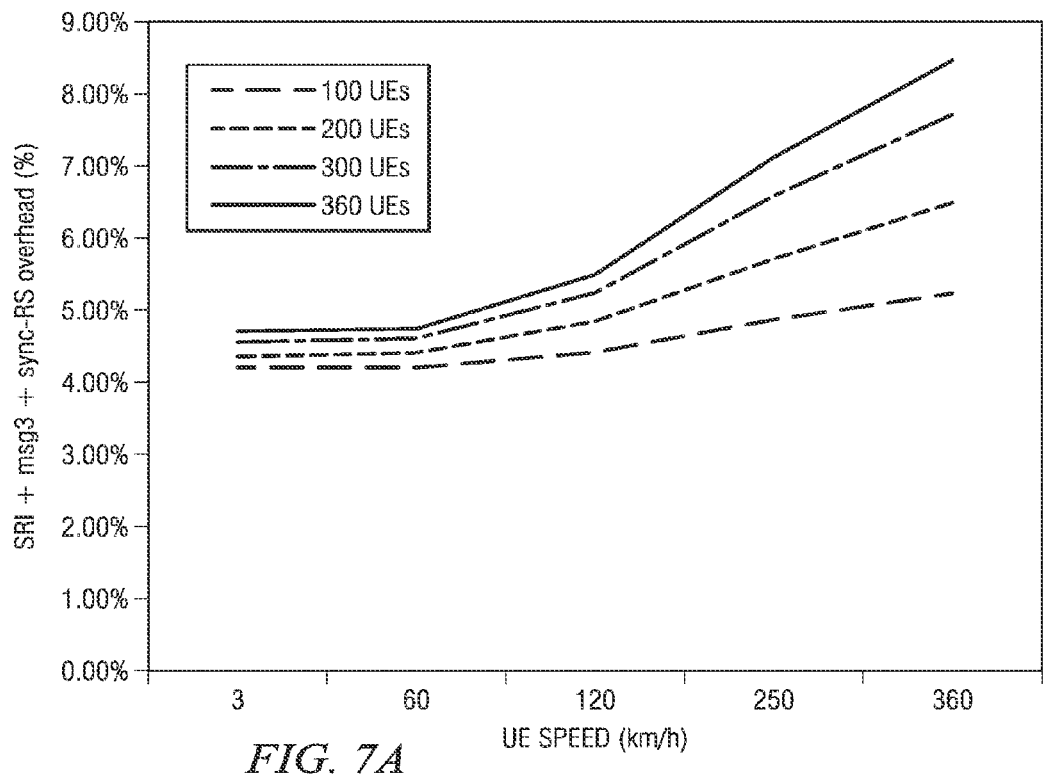
FIG. 7A is a plot illustrating overhead resulting from the SRI-based TA request procedure of FIG. 6.

FIG. 7A shows the overhead resulting from the aforementioned SRI-based TA request procedure 600, where to the 4% constant overhead of the SRI is added the overhead due to the TA request message 603 (1 RB/1 sub-frame) and the following sync-RS (6 RBs/1 OFDM symbol). As can be observed, the savings are significant compared to the RA overhead.

In another embodiment, the SRI is sent together with a contention-based SRS which provides means for both TA and CQI estimation. An example of the structure of such SRI is described in the USPTO patent application Ser. No. 11/866, 912 "An Efficient Scheduling Request Channel For Wireless Networks". The number of supported UEs in 5 MHz is 512 or 256 depending on whether the procedure is optimized in support of TA requests or not. As above and unlike for the RA, the contention free nature of the SRI makes it unnecessary to allocate more SRI time frequency slots in support of TA requests. The only impact of the additional load is the contention increase on the contention-based wideband SR (or SRS). Therefore, the SRI overhead increase in support of TA requests can be computed as follows. First compute the percent of SRS colliding UEs based on the TA request load added on top of an assumed on-going offered load of 0.5 due to scheduling requests only. Then, distinguish between signaling procedures. As elaborated in the USPTO patent application Ser. No. 11/120,50382 "Scheduling Request Usage In DRX Mode in Wireless Networks", in one procedure, an SRI is sent, after receiving scheduled resources a timing adjustment request is made. In an alternate optimized procedure, the SRI includes an embedded bit of information to indicate when only a TA is needed. In this case, the timing adjustment command is sent by the eNB in response to the encoded SRI.

Figure 7B:
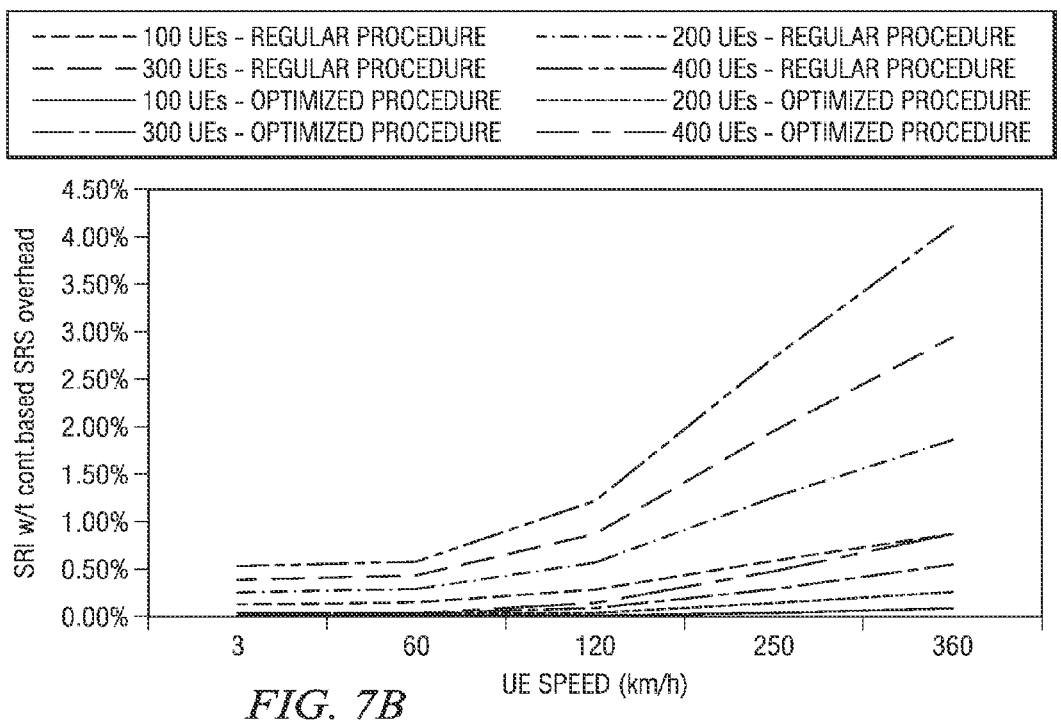
FIG. 7B is a plot illustrating overhead resulting from the SRI with contention-based SRS TA request procedure.

For the first signaling procedure, the percent of SRS non-colliding UEs will send a scheduling request message (aka TA request) similar to message 603 over 1 RB/1 sub-frame and the percent of colliding UEs will additionally send one SRS over one symbol. 6 RBs. For the optimized procedure for TA requests, the percent of non-colliding UEs will not consume any additional overhead and the percent of colliding UEs will additionally send one SRS over one symbol. 6 RBs. It should be noted that all additional SRSs resulting from collisions are accounted separately in the overhead, and further optimization would be achieved in practice by multiplexing in CDM and/or FDM some of these SRSs in the same time frequency symbol. However, the overhead results show in FIG. 7B that the overhead of this SRI with contention-based SRS, compared to the RA overhead, is within much more acceptable ranges, and is also lower than the overhead of SRI 600.

In conclusion, the UL synchronization of a large number of UEs can be achieved through eNB controlled UL transmissions with low overhead. In addition, in order to track sudden path profile variations (e.g. when UE turns around a block) or extreme speeds, this scheme can be complemented by autonomous TA requests triggered at the UE upon observed DL timing variations. Both the regular and simple SRI structure and procedure currently defined in the LTE specifications and the more advanced ones described in the abovementioned USPTO patent applications can efficiently serve this purpose. Referring again to FIG. 4, for high speed cells 412 or in cases of rapid direction change, the UE can determine timing error based on transmissions received from the eNB in the downlink. If the error exceeds a threshold, then a TA request is autonomously sent 414 to the eNB in order to maintain synchronization. The UE may autonomously send TA requests at a higher rate than the periodic sync-RS in order to better maintain synchronization with the eNB.

Sync-RS Sequence

The sync-RS sequence is generated as any other SRS sequence, from a long constant amplitude zero autocorrelation (CAZAC) complex sequence allocated to the UE among a set of $R_S$ possible sequences. These sequences are built from cyclic shifts of a common CAZAC root (or base) sequence, configured by the eNB.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[j2\pi \frac{M}{N}\left(\frac{k(k+1)}{2} + qk\right)\right] \qquad (1)$$

where M is relatively prime to N, N odd, and q any integer.

The latter constraint on N also guarantees the lowest and constant-magnitude cross-correlation $\sqrt{N}$ between N-length sequences with different values of M: $M_1$, $M_2$ such that ($M_1 - M_2$) is relatively prime to N. As a result, choosing N a prime number always guarantees this property for all values of M<N, and therefore maximizes the set of additional sequences, non orthogonal, but with optimal cross-correlation property. These additional sequences are typically intended to be used in neighboring cells, so as to provide good inter-cell interference mitigation.

The above constraint on the sequence length may not match the number Nsc of sub-carriers corresponding to the bandwidth allocated to the SRS. In that case, N is chosen as the largest prime number smaller than Nsc and the N-length sequence is extended to a Nsc-length sequence through cyclic extension. Such resulting sequence is referred to as CAZAC-like sequence.

SRS resources are orthogonally multiplexed across the following dimensions: time (sub-frame), frequency resource blocks, frequency sub-carriers, and sequence cyclic shift.

Figure 8:
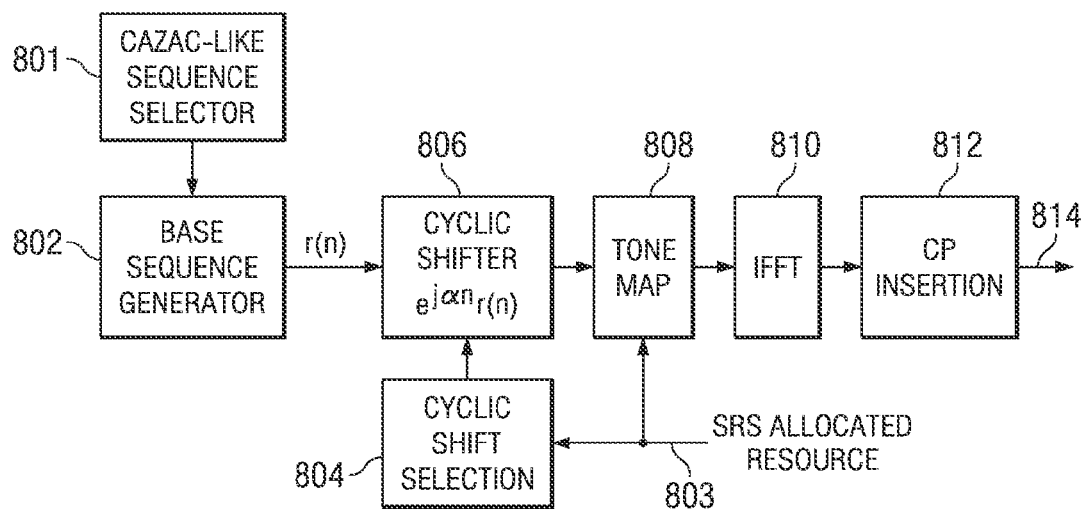
FIG. 8 is a block diagram of an illustrative transmitter for transmitting a synch-RS.

FIG. 8 is a block diagram of an illustrative transmitter 800 for transmitting a sync-RS. Elements of the transmitter may be implemented as components in a fixed or programmable processor by executing instructions stored in memory. Transmitter 800 is used to select and perform the sync-RS transmission as follows. The UE performs selection of the CAZAC-like (e.g. ZC or extended ZC or zero-autocorrelation QPSK computer-generated) base sequence using the CAZAC-like Root Sequence Selector 801. The UE generates the CAZAC-like (e.g. ZC or extended ZC or zero-autocorrelation QPSK computer-generated) sequence using base sequence generator 802. The eNB provides the UE with an SRS resource allocation 803 allowing inserting the UE in the SRS multiplex. This SRS resource index directly or indirectly defines 804 a cyclic shift value α. The base sequence is then shifted by cyclic shifter 806 using shift values provided by cyclic shift selection module 804.

The resulting frequency domain signal is mapped onto a designated set of tones (sub-carriers) using the Tone Map 808. The Tone Map 808 performs all appropriate frequency multiplexing (tone level as well as RB level) according to the SRS resource allocation 803. The UE next performs IFFT of the mapped signal using the IFFT 710. A cyclic prefix is created and added in module 812 to form a final fully formed uplink signal 714.

Figure 9:
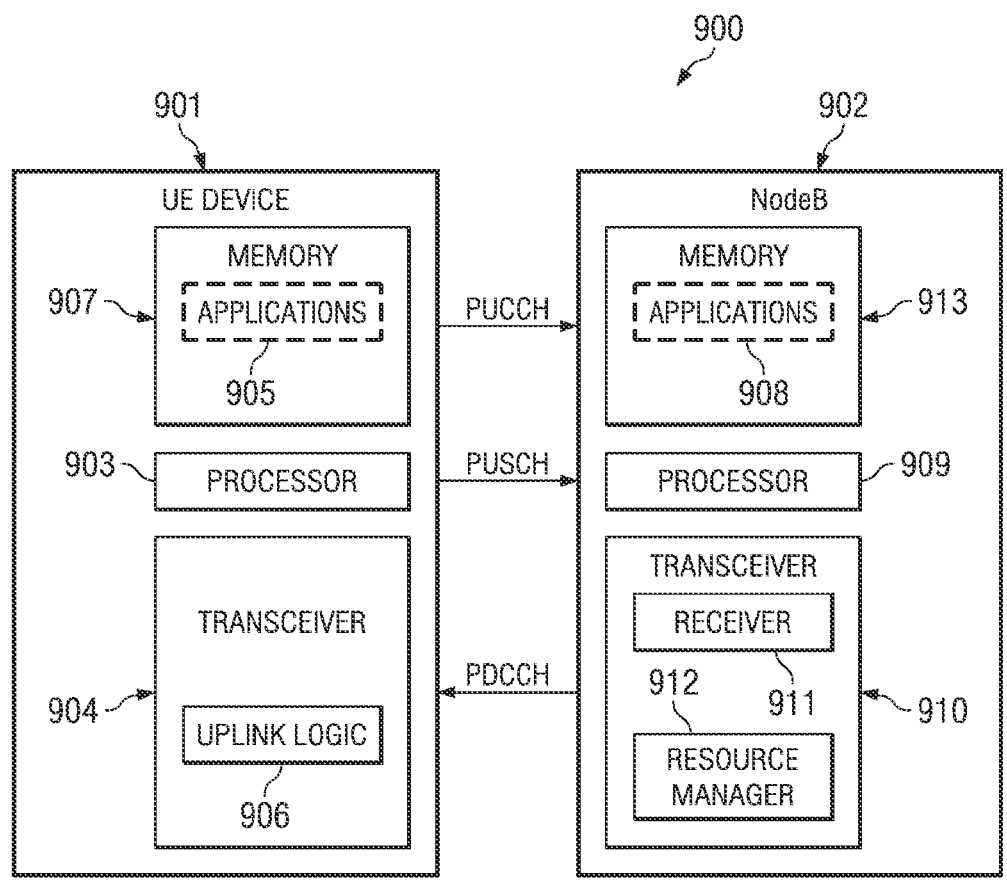
FIG. 9 is a block diagram of a Node B and a User Equipment for use in the network system of FIG. 1.

FIG. 9 is a block diagram illustrating operation of a eNB and a mobile UE in the network system of FIG. 1. As shown in FIG. 9, wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LIE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOID) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VOIP and gaining applications often involve low-latency uplink (UL) transmissions while High Throughput (HTP)/Hypertext Transmission Protocol (HTTP) traffic can involve high-latency uplink transmissions.

As shown in FIG. 9, the transceiver 904 comprises uplink logic 906. The uplink logic executes instructions that control the operation of the transceiver. Some of these instructions may be stored in memory 907 and executed when needed. When no data is expected for transmission, the uplink logic places the transceiver in a low power DRX mode. While in DRX mode, the uplink logic will periodically transmit a sync-RS as discussed with reference to FIGS. 2-4 to maintain synchronization with eNB 902. As would be understood by one of skill in the art, the components of the Uplink Logic 906 may involve the physical (PHY) layer and/or the Media Access Control (MAC) layer of the transceiver 904.

As shown in FIG. 9, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH, UE that are in DRX mode may ignore the downlink control information and the eNB does not expect to receive transmissions from a UE in DRX mode. However, if a UE in DRX mode transmits a sync-RS on the PUSCH, then resource manager 912 performs a timing analysis of the sync-RS and sends a TA if needed back to the UE in order to maintain synchronization. If the eNB is serving a cell with high speed UE or subject to fast channel variations such as e.g. urban environments (canyon streets), then autonomous TA requests may also be received from the UE at a higher rate than the periodic sync-RS, as discussed with reference to FIGS. 4-8

Figure 10:
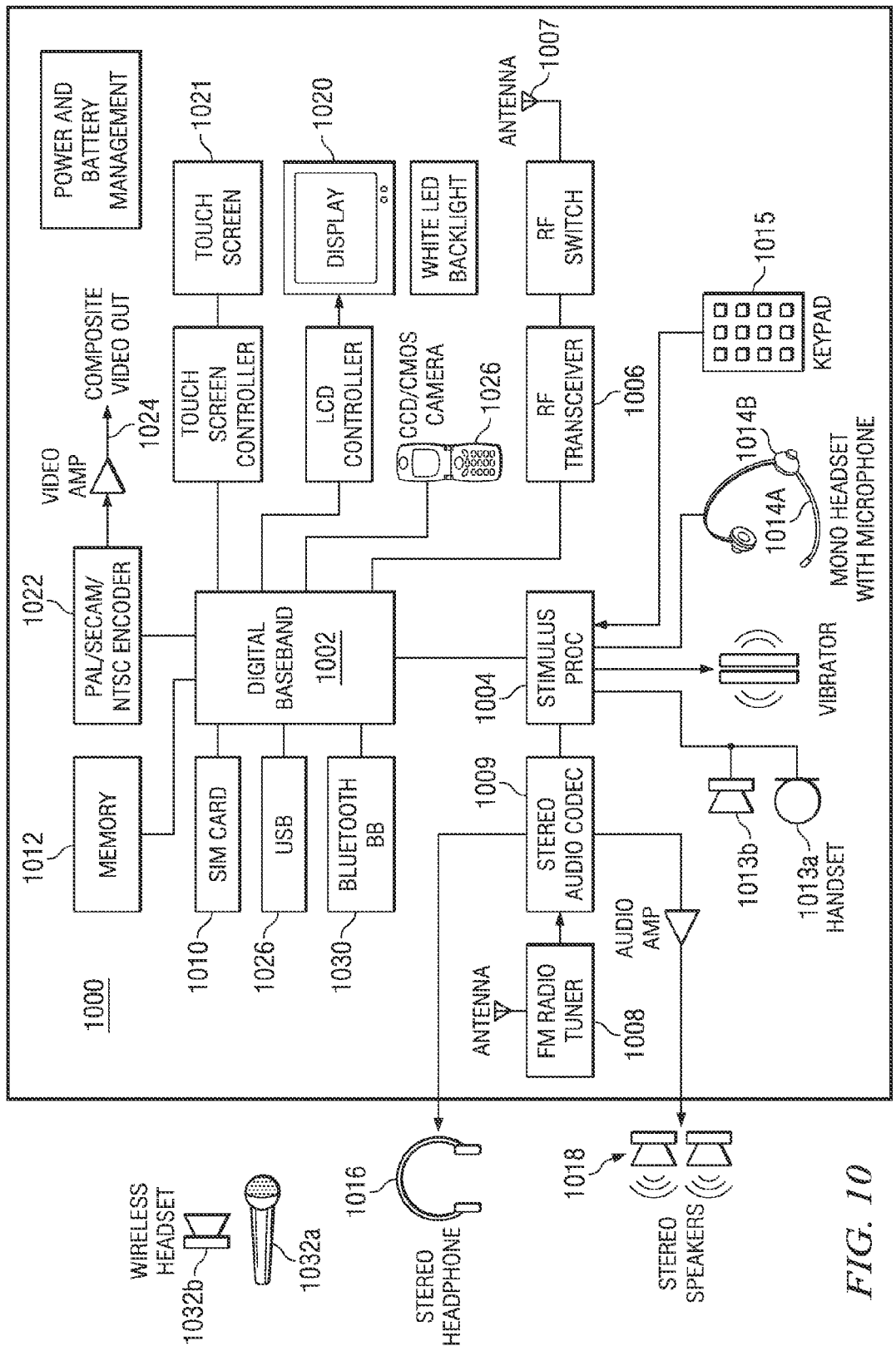
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment. SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

When no data is expected for transmission, the DBB places transceiver 1006 in a low power DRX mode. While in DRX mode, the transceiver is not required to monitor downlink control message from a serving eNB, nor does it send to the eNB. While in DRX mode, the DBB will periodically send a sync-RS to the eNB to maintain synchronization as descried above with reference to FIGS. 2-4. Also, for cells which are determined to be high speed cells or urban cells where fast channel variations are expected, the UE may autonomously send TA requests at a higher rate than the periodic sync-RS in order to better maintain synchronization with the eNB.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment the sync-RS may use more or possibly fewer resource blocks for greater or less accuracy, respectively. Various schemes may be employed to determine a period for the periodic sync-RS schedule other than those suggested herein.

It is therefore contemplated that the appended claims will cover any such modifications of the embodiments as fall within the true scope and spirit of the invention.

The invention claimed is:

1. A method for maintaining synchronization in a cellular network between a plurality of user equipment (UE) in a cell and a base station (eNB) serving the cell, comprising:
   maintaining synchronization of the scheduled UE with the eNB by sending a timing adjustment (TA) command if needed in response to receiving a scheduled transmission from each respective scheduled UE; and
   maintaining synchronization of the UE in the DRX mode with the eNB by allocating a periodic reference signal (sync-RS) to the UE in the DRX mode and by sending a respective TA command if needed in response to a respective sync-RS received from the UE in the DRX mode.

2. The method of claim 1, further comprising determining a maximum TA rate expected for the cell, and wherein the sync-RS period is configured by the eNB to be approximately equal to the maximum TA rate expected in the cell.

3. The method of claim 1, further comprising determining a maxi um TA accuracy targeted in the cell, and wherein the sync-RS bandwidth is configured by the eNB to be approximately equal to the inverse of the maximum TA accuracy targeted in the cell.

4. The method of claim 1, wherein the sync-RS is allocated every n sub-frames in a symbol slot not used by a demodulation reference signal (DMRS) or by data transmission.

5. The method of claim 4, wherein the sync-RSs are orthogonally multiplexed in code division multiplexing (CDM), in frequency division multiplexing (FDM), and in time division multiplexing (TDM).

6. The method of claim 4, wherein the sync-RSs are orthogonally multiplexed in code division multiplexing (CDM) and in frequency division multiplexing (FDM) in the same OFDM symbol with other sounding reference signals (SRS) used by scheduled UEs.

7. The method of claim 5, further comprising performing CDM multiplexing of the sync-RS by cyclic shifting a constant amplitude zero autocorrelation (CAZAC)-like sequence.

8. The method of claim 1, further comprising:
   transmitting to a UE in the DRX mode on a downlink (DL) channel; and
   receiving an autonomous TA request from the UE in the DRX mode in response to a timing variation beyond a threshold observed by the UE in the DL channel transmission from the eNB.

9. The method of claim 8 where the timing variation observed by the UE in the DL channel transmission from the eNB is a time shift of the received delay profile.

10. The method of claim 8 where the timing variation observed by the UE in the DL channel transmission from the eNB is a variation of the delay spread of the received delay profile.

11. The method of claim 8, wherein the autonomous TA request is conveyed by a scheduling request indicator (SRI), on an uplink (UL) channel used to transmit new scheduling requests.

12. The method of claim 1, wherein the UE and the eNB communicate via orthogonal frequency division multiple access (OFDMA).

13. A method for maintaining synchronization in a cellular network between a user equipment (UE) in a cell and a base station (eNB) serving the cell, comprising:
    placing the UE in a discontinuous reception mode (DRX) while the UE has no data to transmit;
    receiving an allocation from the eNB for a periodic reference signal (sync-RS);
    transmitting the sync-RS to the eNB periodically while in DRX mode; and
    receiving a timing adjust (TA) command, if needed, from the eNB in response to the sync-RS.

14. The method of claim 13, further comprising determining a maximum TA rate expected for the cell, and wherein the sync-RS period is configured by the eNB to be approximately equal to the maximum TA rate expected in the cell.

15. The method of claim 13, further comprising determining a maximum TA accuracy targeted in the cell, and wherein the sync-RS bandwidth is configured by the eNB to be approximately equal to the inverse of the maximum TA accuracy targeted in the cell.

16. The method of claim 13, wherein the sync-RS is allocated every n sub-frames in a symbol slot not used by a demodulation reference signal (DMRS) or by data transmission.

17. The method of claim 16, wherein the sync-RSs are orthogonally multiplexed in code division multiplexing (CDM), in frequency division multiplexing (FDM), and in time division multiplexing (TDM).

18. The method of claim 16, wherein the sync-RSs are orthogonally multiplexed in code division multiplexing (CDM) and in frequency division multiplexing (FDM) in the same orthogonal frequency domain modulation (OFDM) symbol with other sounding reference signals (SRSs) used by scheduled UEs.

19. The method of claim 17, further comprising performing CDM multiplexing of the sync-RS by cyclic shifting a constant amplitude zero autocorrelation (CAZAC)-like sequence.

20. The method of claim 13, further comprising
    receiving a transmission at the UE from the eNB in the DRX mode on a downlink (DL) channel; and
    transmitting an autonomous TA request from the UE in response to a timing variation beyond a threshold observed by the UE in the DL channel transmission from the eNB.

21. The method of claim 20, wherein the autonomous TA request is conveyed by a scheduling request indicator (SRI), on an uplink (UL) channel used to transmit new scheduling requests.

* * * * *